Patented Mar. 12, 1946

2,396,275

UNITED STATES PATENT OFFICE 2,396,275

PROCESSES OF COLOR PHOTOGRAPHY AND COMPOSITIONS AND ELEMENTS THEREFOR UTILIZING POLYMERIC QUATERNARY AMMONIUM DYE INTERMEDIATES

James E. Kirby, Wilmington, Del., assignor to E. I. du Pont de Nemours & Company, Wilmington, Del., a corporation of Delaware No Drawing. Application July 17, 1942, Serial No. 451,290

5 Claims. (Cl. 95—6)

This invention relates to dye intermediates. More particularly it relates to high molecular weight dye intermediates suitable for use in colloid layers in photographic elements. Still more particularly it relates to polymeric quaternary ammonium compounds containing dye intermediate nuclei connected through an acyclic carbon atom to the quaternary nitrogen atoms of said polymeric compounds. The invention also relates to the preparation of such compounds, to photographic elements containing the same, and to photographic color processes utilizing them as dye intermediates or color formers.

An object of this invention is to provide new high molecular weight dye intermediates. A further object is to provide dye intermediates which are immobile in water-permeable colloid layers. A still further object is to produce immobile polymeric dye intermediates which are resistant to leaching in the common photographic processing baths. Another object is to provide suitable polymeric dye intermediates for photographic color coupling developing procedures. Yet another object is to provide new and useful photographic elements and compositions containing polymeric quaternary ammonium salts which contain dye nuclei capable of forming an azo dye and/or a quinoneimine or azomethine dye. Still another object is to obtain dye intermediates from compounds which can be prepared in a simple manner and/or are readily available. Still other objects will be apparent from the following description of the invention.

The dye intermediate compounds of this invention are polymeric quaternary ammonium salts having in the recurring polymeric units a quaternary nitrogen atom which has attached thereto by acyclic carbon a dye coupling component nucleus capable of reacting to form an azo, azomethine, or quinoneimine dye.

One important group of this class of compounds is that wherein the quaternary nitrogen atoms are intralinear, e. g., are integral members of the linear polymeric chain. The intralinear quaternary nitrogen atoms in the chain are connected through bivalent hydrocarbon radicals, or through bivalent radicals which are hydrocarbon interrupted by nonterminal oxy- (ether), carbonamido (amide) or carbonoxy (ester) groups. Attached to each linear quaternary nitrogen atom is a salt forming anion, e. g., the anion of a halogen acid. One of the remaining valences of the pentavalent nitrogen is connected by an acyclic carbon atom and more particularly by a methylene (—CH₂—) group to a dye coupling component capable of forming an azo, a quinoneimine (including indoaniline, indophenol and indamine), or an azomethine dye. The remaining valence of the nitrogen is satisfied by an aliphatic hydrocarbon radical.

Another important group of this class of compounds is that wherein the quaternary nitrogen atoms are extralinear, e. g., are outside the linear chain connecting the polymeric units. In these compounds the quaternary nitrogen atom is attached through a bivalent connecting radical to the linear polymeric chain. A second valence of the pentavalent nitrogen is satisfied through an acyclic carbon atom and preferably by a methylene (—CH₂—) radical which links the quaternary nitrogen to a dye coupling component nucleus capable of reacting to form an azo, a quinoneimine, or an azomethine dye; another valence of the nitrogen is satisfied by a salt-forming anion, e. g., the anion of a halogen acid; the remaining valences of the nitrogen being satisfied by aliphatic hydrocarbon radicals. The linear polymeric chains to which the quaternary nitrogen atom is attached by a bivalent connecting radical may be polymeric hydrocarbon, polymeric polyamide, polymeric carbohydrate, or the polymeric reaction products derived essentially from phenol and formaldehyde, and the like.

The polymeric quaternary ammonium salts of this invention can be prepared by methods well known in the art. In general, equimolar amounts of a polymeric compound containing a tertiary amine group in the recurring unit can be heated in solution with a dye forming nucleus containing a mono halogenomethyl group to form a polymeric quaternary ammonium salt of the desired structure.

One source of polymeric compounds containing a tertiary amino group in the linear chain is the linear polyamides containing intralinear tertiary amino groups, the preparation of which is described in U. S. 2,274,831. For example, a polyamide prepared as in Example 4 of that application from hexamethylenediamine and piperazine diacetic acid may be boiled in a dilute ethanol solution with one-half of an equimolar amount of a color former such as meta-alpha-bromoacetaminophenol, until the reaction is substantially complete. Then a dilute aqueous solution of para-chloromethyl benzene sodium sulfonate in amount molecularly equivalent with the color forming compound is added and boiling continued until this second reaction is complete. Evaporation of the alcohol and acidification with hydrochloric acid and subsequent washing of the residue with water, give a polymer having the following probable unit structure:

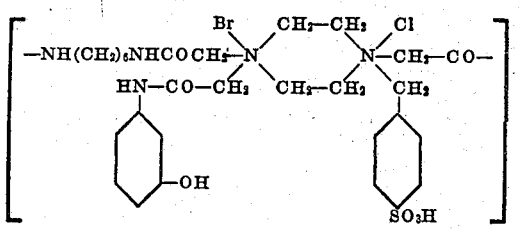

A source of polymeric quarternary ammonium salts having a color former attached to a quaternary salt-forming nitrogen which is not part of the linear polymeric chain is the polymeric methacrylic esters containing tertiary amino groups on the ester alcohol residues as described in U. S. Patent 2,138,762. In the preparation of a compound of this invention the dimethylaminoethyl ester of Example 1 of that patent is dissolved in dioxane, and is heated with an equal volume of water containing an equimolar amount of the sodium salt of 1-N-3'-chloro-2'hydroxy-propylamino-naphthalene-6-sulfonic acid, the preparation of which is described in Woodward application Ser. No. 437,085. The reaction is continued to completion, the reaction product is acidified with an excess of hydrochloric acid and the product washed with water. A quaternary salt prepared in this manner has the following probable unit structure:

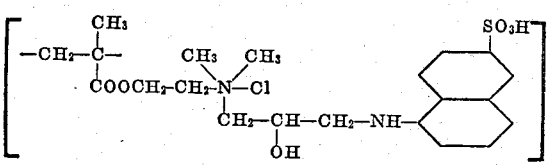

A further source of polymeric tertiary amines is the tertiary amine resins obtained by treating polymeric ketones with monoalkylamines as in U. S. Patent 2,122,707. These can be suitably reacted to produce polymeric quaternary ammonium salt dye intermediates of the type set forth above. For example, the ethanolamine-polymeric methyl vinyl ketone product of Example 8 of the above patent is dissolved in ethanol, the solution heated and a dilute aqueous solution of 1 molar equivalent of the sodium salt of 1-N-3'-chloro-2'-hydroxypropylaminonaphthalene - 5 - sulfonic acid described in the above mentioned Woodward application added. The reaction is continued at boiling temperatures to completion and the precipitate is washed. After drying an alkali-soluble polymeric quaternary ammonium dye intermediate is obtained.

Similarly aliphatic amine-phenol-formaldetype resins as described in U. S. Patents 2,122,433, 2,089,869, 2,101,215, and 2,031,557 can be reacted with a suitable halogenomethyl dye intermediate to yield a polymeric quaternary salt of the above described type. For example a phenol-formaldehyde methyl amine resin prepared as described in U. S. 2,089,869 can be reacted with the halogenomethyl compound of the previous paragraph and under similar condition to give a polymeric quaternary ammonium salt containing a dye intermediate nucleus.

Likewise, tertiary amino derivatives of proteins as described in U. S. Patent 2,143,023 and as exemplified by the dimethylamineformaldehydezein product of Example 3, can be reacted with a suitable primary halide such as a 1-N-3'-chloro-2'-hydroxy-propylaminonaphthylene sulfonic acid in the same manner as above described to give polymeric quaternary ammonium dye intermediates or color formers.

Similarly, dialkyl derivatives of aminocellulose as described in U. S. Patents 2,136,299 and 2,136,296 can be reacted with halogenomethyl dye intermediates to form compounds of this invention. For example, diethylaminoethyl cellulose of Example 7 of U. S. 2,136,299 can be reacted with 1-m-chloroacetaminophenyl-3-methyl-5 - pyrazolone and para-chloromethyl benzene sodium sulfonate in accordance with the procedure in the preceding paragraphs to form a polymeric quaternary ammonium dye intermediate.

The dye coupling component nuclei which are capable of reacting to form an azo, a quinoneimine, or azomethine dye and which are attached to the quaternary salt-forming nitrogen atoms through an acyclic carbon atom, preferably a methylene —CH₂— group, can be divided into three broad classes, as follows:

A. Aromatic hydroxyl compounds wherein a phenolic hydroxyl group is attached to a six membered aromatic ring system and which has in either the 2 or 4 position relative to said phenolic hydroxyl group, a hydrogen atom or a group readily replaceable in coupling reactions. Such groups include halogen, carboxylic and sulfonic acid groups. The most important typical members of this class are substituted and unsubstituted mono- and dihydric phenols and naphthols.

B. Aromatic primary, secondary and tertiary amines wherein the amino group is attached to a six membered aromatic ring system and which have either in the 2 or 4 position to said amino groups a hydrogen atom or a group readily replaceable in coupling reactions, e. g., halogen, carboxylic and sulfonic acid groups. The most important typical members of this class are substituted and unsubstituted mono- and diaminobenzenes and aminonaphthalenes.

C. Compounds having an acyclic or intracyclic methylene group one of whose hydrogen atoms is replaceable by alkali metal in aqueous alkaline solution. Said methylene group derives its reactivity by reason of being directly attached through one of its covalent single bonds to one of the following groups

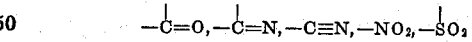

and also being attached through its remaining covalent single bond either directly or through an even numbered chain of carbon atoms alternately connected by double bonds to one of these same groups. The most important typical members of this class are substituted pyrazolones, e. g., 1-phenyl-3-methyl-5-pyrazolone, beta-diketones, beta-keto acid esters, amides, etc. and p-nitrobenzyl-cyanides.

In one aspect of this invention, the polymeric quaternary ammonium salts derived from polymeric tertiary amines falling under the above classes contain acidic salt-forming groups, preferably carboxylic and sulfonic groups, which may be present on the dye intermediate nucleus, or as substituents on the linear chain connecting the polymeric units. These groups introduce water-solubility into the intermediates and make it possible to disperse them in a gelatin-compatible state. This is of importance in color photography since clear films and bright colors can thereby be produced.

The halogenomethyl groups are readily introduced in the dye nuclei in a number of different ways, using methods which are well known in the art. The following is a partial list of the methods that may be employed.

1. Reaction of halo-acid halides, such as 2-chloropropionyl chloride with an amine-containing dye intermediate to form an amide, or a phenolic compound to form a ketone, both of which will contain a —CH₂Cl group suitable for use in quaternization.

2. Reaction of an aliphatic polyhalide, e. g., ethylene dibromide with one equivalent of an amine or phenolic compound.

3. Reaction of a primary amino aromatic sulfonic acid compound with an epihalohydrin, e. g., chloropropylene oxide, as described in copending application, Ser. No. 437,085, filed March 31, 1942.

4. Addition of hydrogen halide to terminally unsaturated side chains.

5. Condensation of an aromatic amine with an aliphatic halo-aldehyde, followed by reduction of the Schiff's base linkage.

Other known methods may also be employed, the only restriction being that the product be still a dye intermediate, i. e., the reaction to introduce the substituted halogeno methyl group must not destroy the dye-forming properties.

An important aspect of the invention is concerned with photographic color-yielding elements and colloid layers and compositions for depositing such layers which contain a water-permeable colloid binding agent and one of the novel polymeric dye intermediates hereof.

In making the photographic or color-yielding elements, the polymeric dye intermediates may be brought into solution with a solvent such as alcohol or in the case of products containing carboxylic or sulfonic acid groups, they may be dissolved in dilute aqueous sodium carbonate of about 1 to 5% strength, and then mixed with an aqueous dispersion of a water-permeable or reversible colloid such as gelatin, agar-agar, gum arabic, albumin, gelatin substitutes and other materials used in making photographic elements and coated on a film base or support having a substratum of the type suitable for anchoring silver halide layers. The same type of coating procedures used for silver halide emulsion layers has been found satisfactory. The gelatin dispersions may be coated onto a light sensitive silver halide layer or stratum or a water permeable layer coated on such layer or stratum. In the case of color-yielding elements for contact or imbibition development of the type described in United States Patent 2,328,034 and Murray application Ser. No. 370,195, the dispersions may be coated directly onto a base or support e. g. a "subbed" film base. The dye intermediates also may be admixed with gelatin silver halide emulsions and coated to form single or multilayer photographic elements.

The invention will be illustrated but is not intended to be limited by the following examples in which the parts stated are parts by weight.

*Example I*

A solution of 200 parts of methanol and 10 parts of poly-N-methylimino-di-n-propylsebacamide is boiled while a solution of 20 parts of 1-(3'-chloro-2'-hydroxypropyl)amino-naphthalene-6-sulfonic acid (prepared by the process of application, Serial No. 437,085, Example 3) in 100 parts of water containing 3 parts of sodium hydroxide is added and boiling continued for 24 hours. The insoluble material is washed three times with boiling water and methanol, then dried and ground to give 25 parts of a light tan resin which has the following probable unit structure:

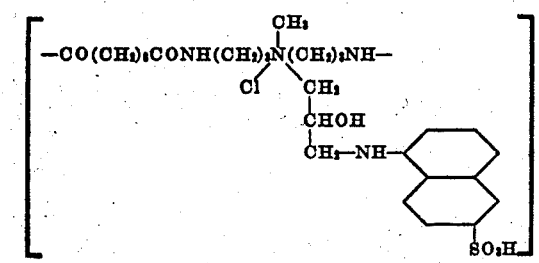

Ten parts of this polymer is dissolved in 100 parts of 1% sodium hydroxide solution, added to 1000 parts of a photographic silver chloride-bromide emulsion containing about 10-12% solids. The mixture is neutralized to a pH of about 7-8 and coated on a cellulose acetate film base. Upon exposure to an objective field and development with a p-aminodiethylaniline developer followed by treatment in Farmer's reducer, a magenta indamine dye image is formed. When this film is subjected to an azo coupling procedure after the manner set forth in application, Serial No. 335,416, a bright magenta dye may be obtained by use of the proper diazonium compounds as therein described for reaction with 1-naphthylamines.

*Example II*

In an experiment similar to the above the polyamide is replaced by poly-hexamethylene-N-methylimino-diacetamide and the dye intermediate by 1-(3'-chloro-2'-hydroxypropylamino)-5-naphthol-7-sulfonic acid, (prepared by the process of application, Serial No. 437,085, Example I). The resulting product has the following probable color unit structure:

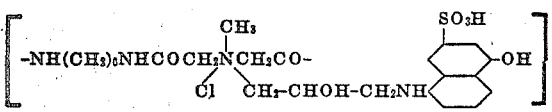

Incorporated in a photographic silver halide emulsion and processed as in the above example, a blue indophenol dye image is obtained. When this film is used in the azo process as in Example I, a blue-green dye image may be obtained by coupling with a diazotized 2-substituted derivative of p-nitro-aniline; i. e., 2-chloro-4-nitroaniline.

*Example III*

A solution of 10 g. of poly-N-methylimino-di-n-propyladipamide in 100 parts of methanol is boiled while a solution of 15 parts of 1-(3'-bromoacetylaminophenyl) - 3 - methyl-5-pyrazolone in 100 parts of water is added. The solution is boiled for 24 hours and the precipitate treated as in Example I. This product may similarly be incorporated in photographic silver halide emulsions and when processed by chromogenic development followed by bleaching and fixing, a magenta dye image is obtained. When used in the azo process as described in Example I a brilliant yellow image may be obtained with any of the diazonium bodies recommended in said application.

*Example IV*

A solution of 145 parts of poly-beta-dimethylaminoethyl methacrylate (for preparation see U. S. Patent 2,138,762) and 272 parts of N-(4- beta-bromoethoxybenzoyl) acetanilide (prepared from 4-hydroxybenzoylacetanilide and ethylene dibromide) in 1200 parts of ethanol is boiled 10 hours, then 50 parts of chloroacetic acid is added to provide for alkaline solubility of the final product, and after 15 hours the precipitate is removed, washed with alcohol and hot water, dried, and ground to give 400 g. of a light straw-colored polymer of the following probable color-unit structure:

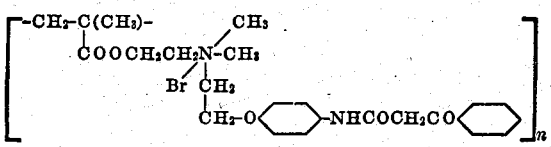

When this compound is used as is the product of Example I bright yellow azomethine dyes are formed and when used in conjunction with the proper diazonium compounds as prescribed for use with active methylene compounds in the above-mentioned application bright yellow azo dyes are obtained.

*Example V*

A solution of 150 parts of resorcinol mono-beta-bromo-ethyl ether and 149 parts of a phenol-formaldehyde-methylamine resin as prepared in U. S. patent 2,098,869 in 800 parts of acetone is boiled for 12 hours; 50 parts of bromoacetic acid is added and the boiling continued for 12 hours. The precipitate is treated as before to yield 300 g. of a nearly white powder. When used as is the product in Example I, a blue-green indophenol or a yellow azo dye image may be produced by choice of the proper reaction conditions as mentioned above.

These condensations of poly tertiary amines and halides may be carried out in other solvents or solvent mixtures than those used in the examples, but it is preferable that both reactants and especially the polymer be moderately soluble in the system used. Suitable solvents include methanol, ethanol, propanol, isopropanol, butanol benzyl alcohol, dioxan, acetone and aqueous methanol or ethanol. A diluent however is not absolutely necessary. The temperature required may vary with the different reactions from the point at which reaction begins to be detectable, often as low as 25° C. up to decomposition temperature of the reactants, but in general, the best results are obtained at between 70 and 200° C. Concentrations may vary somewhat, but usually about one molar equivalent to about two molar equivalents of the dye intermediate is used for each equivalent of the tertiary amine and the solution concentration may vary from 1% solids to a saturated solution without greatly impairing the yield. The reaction sometimes occurs rapidly, in less than one hour, but usually takes about 6 to 24 hours.

In cases where the dye intermediate nucleus contains no carboxylic or sulfonic acid group as in Examples IV and V, such groups may be introduced by reaction of halo organic acids, for instance, acids of the type

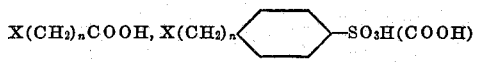

or $X(CH_2)_nSO_3H$ wherein X is chlorine, bromine, or iodine, $n$ is an integer and the hydrogen atoms of the methylene groups may be substituted or the acids may be branched chain but the halogen is preferably primary. These solubilizing reactants may be introduced with the dye intermediate or at a later time to complete the reaction, and in general they are used to replace a part of the normal amount of dye intermediate.

Although the preceding examples represent our preferred methods of preparing the products of this invention, they are by no means the only possible methods. For instance, the products may be obtained by reaction of (1) a dye intermediate having attached thereto a tertiary alkyl-amino group with a polymeric halogen compound in which the halogen atoms are chlorine, bromine or iodine and are preferably primary halogen atoms, (2) a tertiary diamine of the type $R_1R_2N(CH_2)_nNR_3R_4$ where $R_1$ and $R_3$ are dye intermediates attached through aliphatic carbon and $R_2$ and $R_4$ are alkyl groups with a dihalide where the halogens are as defined above. These and other similar reactions involving the condensation of primary and secondary alkyl halides with tertiary alkylamines, one of which contains a dye intermediate nucleus, to form polymeric quaternary ammonium compounds are usually carried out under conditions similar to the methods described in the examples and the isolation and purification is for the most part the same.

In general, any azo dye coupling component into which a halogenoalkyl group, especially a chloromethyl, bromomethyl, chloroethyl, bromoethyl, 1-chlor-hydroxy-2-propyl, 1 - bromo-hydroxy-2-propyl group or a tertiary alkyl amine group, has been introduced may be used in the preparation of the quaternary salts of this invention. Such coupling components may be selected from those found in textbooks on dye chemistry (see, for instance, Fierz-David, Künstliche Organische Farbstoffe pp. 87–205). These dye intermediate nuclei may, of course, contain any one of the common substituents which give desirable properties to the dyes. Such substituents include hydroxyl, amino (—NH₂), hydrocarbon substituted amino, halogen, alkoxyl, hydrocarbon, e. g., alkyl, aryl and aralkyl; carboxyl, nitrile, sulfonic, sulfone, sulfinic, sulfide, nitro, etc.

The color yielding elements may contain light sensitive layers composed of simple or mixed silver halides which may contain the usual sensitizers, desensitizers, stabilizers, fog inhibitors, emulsion hardeners, etc. Suitable types include silver chloride, silver bromide, silver chloro-bromide, silver chloride-bromide-iodide, silver bromide-iodide, etc., which may contain cyanine, carbocyanine, polymethine cyanine, cyazine, carbo-cyazine, pseudocyanine, kryptocyanine, merocyanine, rhodanine, etc. salts and bases. The silver halide layers are anchored to the supports by means of the usual subbing solutions. Such solutions are also useful for anchoring dye component layers to bases.

The products of this invention are not limited in their utility to any one process of color photography. They may be used with other color coupling developing agents than those specifically described in the examples. The di-amino aryl compounds such as para-phenylenediamine and its substitution products are preferred. These developers may be substituted in the amino groups as well as in the ring, preferably the former, to constitute compounds such as the mono- and di-alkyl arylenediamines, including the mono- and di-alkyl naphthylenediamines, alkyl phenylenediamines and alkyl toluylenediamines. The compounds, of course, must have one free primary or unsubstituted amino group which enables the oxidation product of the developer to couple with the color-forming compounds. As examples of developers of the class described, there may be mentioned p - amino - diethylaniline, 1,4-naphthylenediamine, 4-diethylamino-1-naphthylamine. The salts of the bases which may be organic or inorganic are, in general, more soluble and more stable than the free bases. The hydrochlorides and sulfates have great utility in preparing the developing solutions. Hydrazines as set forth in U. S. P. 2,209,929 may also be used according to the process of United States Patent 2,339,213.

The polymeric quaternary salts hereof in general have film-forming properties and can be coated onto a gelatino-silver halide layer or other permeable colloid layer. They thus form a color-yielding stratum free from colloid binding agents.

The polymeric dye intermediate salts of this invention are useful in many arts where dye intermediates are employed. They are especially suited for photographic color processes. Those polymers containing carboxylic or sulfonic acid groups either on the dye intermediate nucleus or introduced by reaction of a halo acid are most desirable as they can be converted to Na, K, Li, Mg etc. salts which are readily soluble in water or dilute sodium carbonate solutions and hence are compatible with photographic emulsions, water soluble colloids and binding agents in general. Due to their molecular size, they are immobile when incorporated in a water-permeable layer on a photographic film or plate and resist the leaching action of all common alkaline and acidic photographic processing baths. For these reasons the preferred products which contain the above solubilizing groups are particularly suited for use in color forming development processes and in the photographic color processes described in United States Patent 2,297,732 involving color coupling development and azo coupling procedures, or in any other similar process where a dye intermediate is required which is fast to diffusion or immobile in colloid layers during photographic processing.

Certain classes of the compounds of this invention find use in other fields, especially in textile coloring where they may be incorporated in cellulosic spinning solutions or they may be converted to azo dyes and, depending on their structure, may be used for coloring textiles or they may be converted to insoluble azo pigments for use in paints, inks, rubber colors, etc.

As many apparently widely different embodiments of this invention may be made without departing from the spirit and scope thereof, it is to be understood that the invention is not to be limited except as defined in the appended claims.

I claim:

1. A photographic composition comprising a water-permeable colloid binding agent containing as a color yielding compound a polymeric quaternary ammonium salt containing recurring quaternary nitrogen atoms and having attached to said atoms, a salt forming anion and, through an acyclic carbon atom, a dye intermediate nucleus capable of coupling to form an azo dye.

2. A color-yielding photographic element comprising a base having superposed thereon at least one water-permeable colloid layer containing a polymeric quaternary nitrogen compound having attached to the quaternary nitrogen atoms of the recurring polymeric unit a salt forming anion and, through an acyclic carbon atom, a dye intermediate nucleus capable of coupling to form an azo dye.

3. A color-yielding photographic element comprising a base having superposed thereon at least one water-permeable colloid layer containing a polymeric quaternary ammonium salt wherein an organic radical attached to the recurring pentavalent nitrogen atoms consists of a dye intermediate nucleus which is connected through an acyclic carbon atom and is capable of coupling to form an azo dye.

4. A color-yielding photographic element comprising a base having superposed thereon at least one water-permeable colloid layer containing a polymeric quaternary ammonium salt having in the recurring polymeric units a quaternary nitrogen atom which has attached thereto, through an acyclic carbon atom, a dye intermediate nucleus capable of (1) reacting with a diazo compound to form an azo dye and (2) forming a dye taken from the group consisting of azomethine and quinoneimine dyes by color coupling development, and a salt forming anion.

5. A photographic element bearing at least one water-permeable colloid layer containing a polymeric quaternary ammonium salt wherein the quaternary ammonium salt forming components attached to the recurring pentavalent nitrogen atoms consist of a dye intermediate nucleus which is connected through an acyclic carbon atom and is capable of coupling with a diazo compound to form an azo dye, and a salt forming anion.

JAMES E. KIRBY.